US011444683B2

(12) United States Patent
Balmakhtar et al.

(10) Patent No.: US 11,444,683 B2
(45) Date of Patent: Sep. 13, 2022

(54) WIRELESS RELAY SLICES IN A WIRELESS COMMUNICATION NETWORK

(71) Applicant: T-MOBILE INNOVATIONS LLC, Overland Park, KS (US)

(72) Inventors: Marouane Balmakhtar, Fairfax, VA (US); Lyle Walter Paczkowski, Mission Hills, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 57 days.

(21) Appl. No.: 17/066,775

(22) Filed: Oct. 9, 2020

(65) Prior Publication Data

US 2022/0116102 A1   Apr. 14, 2022

(51) Int. Cl.
*H04B 7/155* (2006.01)
*H04W 48/18* (2009.01)

(52) U.S. Cl.
CPC .......... *H04B 7/155* (2013.01); *H04W 48/18* (2013.01)

(58) Field of Classification Search
CPC .............................. H04B 7/155; H04W 48/18
See application file for complete search history.

(56) References Cited

U.S. PATENT DOCUMENTS

| 10,299,128 | B1 * | 5/2019 | Suthar | H04W 8/02 |
| 10,575,230 | B2 | 2/2020 | Wang et al. | |
| 10,609,551 | B1 | 3/2020 | Butler et al. | |
| 10,897,498 | B1 * | 1/2021 | Paczkowski | H04L 9/3239 |
| 11,039,366 | B2 * | 6/2021 | Hong | H04L 5/0048 |
| 2018/0288654 | A1 | 10/2018 | Shih et al. | |
| 2019/0174571 | A1 | 6/2019 | Deenoo et al. | |
| 2019/0268633 | A1 | 8/2019 | Jayawardene et al. | |
| 2019/0320322 | A1 | 10/2019 | Jayawardene et al. | |
| 2019/0364616 | A1 | 11/2019 | Mishra et al. | |

(Continued)

FOREIGN PATENT DOCUMENTS

| EP | 3780804 A1 | 2/2021 |
| WO | 2018129543 A1 | 7/2018 |

(Continued)

OTHER PUBLICATIONS

U.S. Appl. No. 16/260,955, filed Jan. 29, 2019.

(Continued)

*Primary Examiner* — Charles N Appiah
*Assistant Examiner* — Nicole M Louis-Fils

(57) ABSTRACT

In a wireless communication network, an Access and Mobility Management Function (AMF) receives signaling for a wireless relay and transfers a slice request to a Network Slice Selection Function (NSSF). The NSSF transfers a network slice Identifier (ID) and relay slice IDs to the AMF. The AMF transfers the network slice ID and the relay slice IDs to a Session Management Function (SMF). The SMF instantiates a network User Plane Function (UPF) responsive to the network slice ID. The SMF instantiates relay UPFs in the wireless relay responsive to the relay slice IDs. The wireless relay wirelessly exchanges data with the UEs. The relay UPFs process the user data for the relay slices. The wireless relay wirelessly exchanges the user data with the wireless access node which exchanges the data with the network UPF. The network UPF processes the user data for the network slice.

16 Claims, 9 Drawing Sheets

(56) References Cited

U.S. PATENT DOCUMENTS

| | | | | |
|---|---|---|---|---|
| 2020/0195495 A1* | 6/2020 | Parker | ................ | H04L 9/3239 |
| 2020/0204444 A1 | 6/2020 | Marquardt et al. | | |
| 2020/0396674 A1* | 12/2020 | Yuan | .................. | H04W 28/16 |
| 2021/0084581 A1* | 3/2021 | Yang | ..................... | H04W 8/08 |
| 2021/0168031 A1* | 6/2021 | Stockert | ............... | H04L 9/0637 |
| 2021/0289391 A1* | 9/2021 | Paladugu | ............. | H04W 28/24 |

FOREIGN PATENT DOCUMENTS

| | | |
|---|---|---|
| WO | 2018149494 A1 | 8/2018 |
| WO | 2019205027 A1 | 10/2019 |
| WO | WO-2020223219 A1 * 11/2020 | ........... H04L 45/302 |

OTHER PUBLICATIONS

"UE-to-Network Relay discovery and handling of PDU session parameters with Remote UE based relay selection;" Philips International B.V.; Jun. 1-12, 2020; pp. 1-7; SA WG2 Meeting #139e, S2-2004202; 3GPP; France.

\* cited by examiner

WIRELESS RELAY SLICES IN A WIRELESS COMMUNICATION NETWORK

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have wireless access nodes which exchange wireless signals with the wireless user devices using wireless network protocols. Exemplary wireless network protocols include Fifth Generation New Radio (5GNR), Millimeter Wave (MMW), Long Term Evolution (LTE), Institute of Electrical and Electronic Engineers (IEEE) 802.11 (WIFI), and Low-Power Wide Area Network (LP-WAN). The wireless access nodes exchange network signaling and user data with network elements that are often clustered together into network cores. The wireless access nodes are usually connected to the network cores over wireline backhaul links.

To extend the geographic range of the wireless data services, the wireless communication networks deploy wireless relays along with the wireless access nodes. The wireless relays have small wireless access nodes that serve a relatively small number of wireless user devices at the network edge. The wireless relays also have wireless user-like devices that are wirelessly served by the wireless access nodes or other wireless relays. Thus, the wireless relays are typically connected to the network cores over both wireless and wireline backhaul links.

In the network cores, the network elements include controllers, gateways, databases, and the like. The network elements comprise hardware like microprocessors, memory, and network interfaces. The network elements also comprise software like operating systems, network applications, and database modules. The network elements or portions of the network elements belong to network slices. For example, one network slice may comprise special gateway and database software that is executed on (non-slice) generic network hardware. Another network slice may comprise a combination of special gateway and database software along with dedicated (in-slice) network hardware to execute the software.

The wireless access nodes and the wireless relays may also host network slices in a like manner to the network cores. The wireless relays are located at the network edge that is often geographically distant from the network cores. Unfortunately, the integration of the wireless relay slices at the network edge with the network slices in the network cores remains largely ineffective and highly inefficient.

TECHNICAL OVERVIEW

In a wireless communication network, an Access and Mobility Management Function (AMF) receives signaling for a wireless relay and transfers a slice request to a Network Slice Selection Function (NSSF). The NSSF transfers a network slice Identifier (ID) and relay slice IDs to the AMF. The AMF transfers the network slice ID and the relay slice IDs to a Session Management Function (SMF). The SMF instantiates a network User Plane Function (UPF) responsive to the network slice ID. The SMF instantiates relay UPFs in the wireless relay responsive to the relay slice IDs. The wireless relay wirelessly exchanges data with the UEs. The relay UPFs process the user data for the relay slices. The wireless relay wirelessly exchanges the user data with the wireless access node which exchanges the data with the network UPF. The network UPF processes the user data for the network slice.

DETAILED DESCRIPTION

Figure 1:
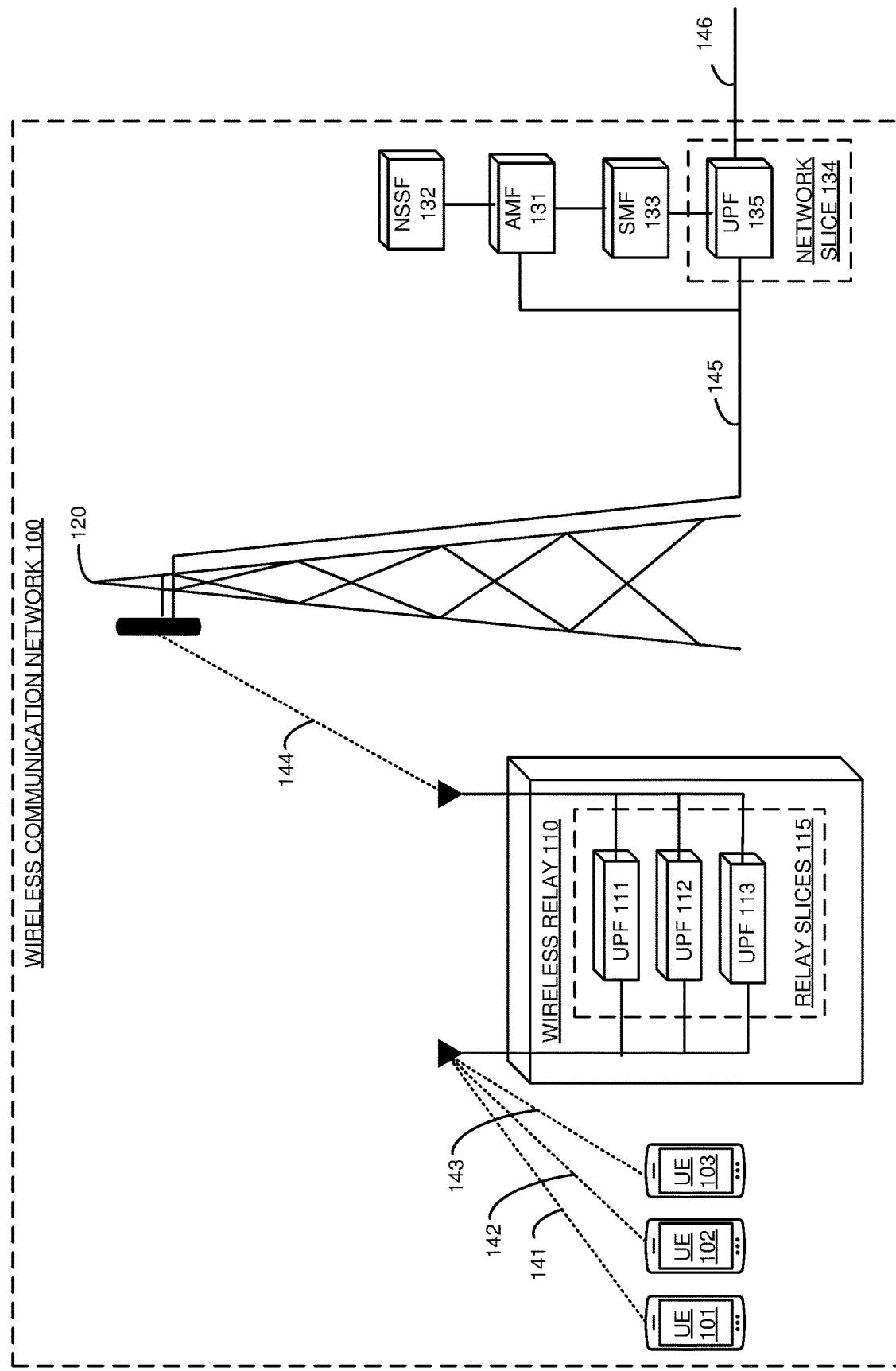
FIG. 1 illustrates a wireless communication network to serve User Equipment (UEs) over relay slices in a wireless relay.

FIG. 1 illustrates wireless communication network 100 to serve User Equipment (UEs) 101-103 over relay slices 115 in wireless relay 110. Wireless communication network 100 delivers wireless data services to UEs 101-103 like internet-access, video-calling, media-streaming, augmented-reality, machine-control, and/or some other wireless networking product. Wireless communication network 100 comprises wireless UEs 101-103, wireless relay 110, wireless access node 120, Access and Mobility Management Function (AMF) 131, Network Slice Selection Function (NSSF) 132, Session Management Function (SMF) 133, and network slice 134. Network slice 134 comprises User Plane Function (UPF) 135 and possibly other networking components. Wireless relay 110 comprises relay slices 115 which include UPFs 111-113 and possibly other networking components. The number of UEs, relays, access nodes, slices, UPFs, and other network elements that are depicted on FIG. 1 has been restricted for clarity, and wireless communication network 100 typically comprises many more UEs, relays, access nodes, slices, UPFs, and other network elements.

Various examples of network operation and configuration are described herein. In some examples, wireless communication network 100 serves UEs 101-103 over relay slices 115 and network slice 134. Initially, wireless relay 110 does not host relay slices 115 when it wirelessly attaches to wireless access node 120. In response to the wireless relay attachment, wireless access node 120 generates and transfers relay attachment signaling for wireless relay 110 to AMF 131. AMF 131 receives the relay attachment signaling and generates a relay slice request for wireless relay 110. AMF 131 transfers the relay slice request to NSSF 132.

NSSF 132 receives the relay slice request and determines a network slice Identifier (ID) and relay slice IDs for wireless relay 110. For example, NSSF 132 may host a data structure that translates IDs for access node/relay pairs into corresponding network slice IDs and relay slice IDs. NSSF 132 transfers the network slice ID and the relay slice IDs for wireless relay 110 to AMF 131, and AMF 131 transfers the network slice ID and the relay slice IDs for wireless relay 110 to SMF 133. SMF 133 receives the network slice ID and the relay slice IDs and instantiates UPF 135 in network slice 134 based on the network slice ID and instantiates UPFs 111-113 in relay 110 for relay slices 115 based on the relay slice IDs.

Wireless relay 110 wirelessly receives a UE attachment from UE 101. In response to the wireless UE attachment, wireless relay 110 generates and transfers UE attachment signaling for UE 101 to AMF 131 over wireless access node 120. AMF 131 receives the UE attachment signaling and generates a UE slice request for UE 101. AMF 131 transfers the UE slice request to NSSF 132. NSSF 132 receives the UE slice request and determines the network slice ID and a set of relay slice IDs for UE 101. For example, NSSF 132 may host a data structure that translates the relay ID and names like "internet-access" and "machine-to-machine" into corresponding relay slice IDs. NSSF 132 transfers the relay slice IDs for UE 101 to AMF 131 and AMF 131 transfers the relay slice IDs for UE 101 to SMF 133. SMF 133 receives the relay slice IDs for UE 101 and directs one or more UPFs 111-113 to serve UE 101 based on the relay slices IDs for UE 101.

Wireless relay 110 wirelessly exchanges user data with UE 101. In wireless relay 110, one or more UPFs 111-113 process the user data for UE 101 based on the selected relay slice IDs. Wireless relay 110 wirelessly exchanges the user data with wireless access node 120. Wireless access node 120 exchanges the user data with UPF 135. UPF 135 processes the user data for network slice 134. UPF 135 typically exchanges at least some of the user data with external systems. Wireless communication network 100 serves UEs 102-103 in a similar manner, although UEs 102-103 may use different relay slices 115 than UE 101.

In some examples, SMF 133 also instantiates Control Plane Functions (CPFs) in wireless relay 110 based on the relay slice IDs. In wireless relay 110, the CPFs handle SMF signaling and UPF control. In some examples, wireless relay 110 uses individual wireless bandwidths, data rates, and/or hardware amounts for individual ones of relay slices 115. In some examples, NSSF 132 transfers a relay ID and a network ID to a distributed ledger, and the distributed ledger processes the relay ID and network ID to generate consensus on the slice IDs for relay slices 115. When the consensus is reached, the distributed ledger indicates the slice IDs for the relay slices 115 to NSSF 132. In some examples, SMF 133 transfers relay slice IDs for relay slices 115 to a distributed ledger, and the distributed ledger processes the slice IDs to generate consensus on relay UPFs 111-113 for relay slices 115. When the consensus is reached, the distributed ledger indicates UPFs 111-113 and their corresponding relay slices 115 to SMF 133. In some examples, UPFs 111-113 generate relay slice usage information for relay slices 115. UPFs 111-113 transfer the relay slice usage information to a distributed ledger, and the distributed ledger processes the relay slice usage information to generate a consensus on the usage of relay slices 115. When the consensus is reached, the distributed ledger indicates the usage of the individual relay slices 115 to other network elements.

Advantageously, wireless communication network 100 effectively and efficiently integrates the instantiation, operation, and control of relay slices 115 with network slice 134.

UEs 101-103 and wireless relay 110 wirelessly communicate over wireless links 141-143. Wireless relay 110 and wireless access node 120 wirelessly communicate over wireless links 144. Wireless links 141-144 use using Radio Access Technologies (RATs) like Fifth Generation New Radio (5GNR), Millimeter Wave (MMW), Long Term Evolution (LTE), Institute of Electrical and Electronic Engineers (IEEE) 802.11 (WIFI), Low-Power Wide Area Network (LP-WAN), and/or some other wireless protocol. The RATs use electromagnetic frequencies in the low-band, mid-band, high-band, or some other portion of the electromagnetic spectrum. Wireless access node 120 communicates with AMF 131 and UPF 135 over backhaul links 145. UPF 135 communicates with external systems over external links 146. Links 145-146 use metal, glass, air, or some other media. Links 145-146 use IEEE 802.3 (Ethernet), Time Division Multiplex (TDM), Data Over Cable System Interface Specification (DOCSIS), Internet Protocol (IP), 5GC, 5GNR, LTE, WIFI, virtual switching, inter-processor communication, bus interfaces, and/or some other data communication protocols.

Although UEs 101-103 are depicted as smartphones, UEs 101-103 might instead comprise computers, robots, vehicles, or some other data appliances with wireless communication circuitry. Wireless access node 120 is depicted as a tower, but access node 120 may use other mounting structures or no mounting structure at all. Wireless relay 110 and wireless access node 120 may comprise gNodeBs, eNodeBs, MMW hot-spots, LP-WAN base stations, relay-UEs, and/or some other form of wireless network transceivers. UEs 101-103, relay 110, and access node 120 comprise antennas, amplifiers, filters, modulation, and analog/digital interfaces. UEs 101-103, relay 110, access node 120, AMF 131, NSSF 132, SMF 133, and network slice 134 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network applications. The microprocessors retrieve the software from the memories and execute the software to drive the operation of wireless communication network 100 as described herein. In some examples, AMF 131, NSSF 132, SMF 133, and UPF 135 comprise Virtual Network Functions (VNFs) in a Network Function Virtualization Infrastructure (NFVI).

Figure 2:
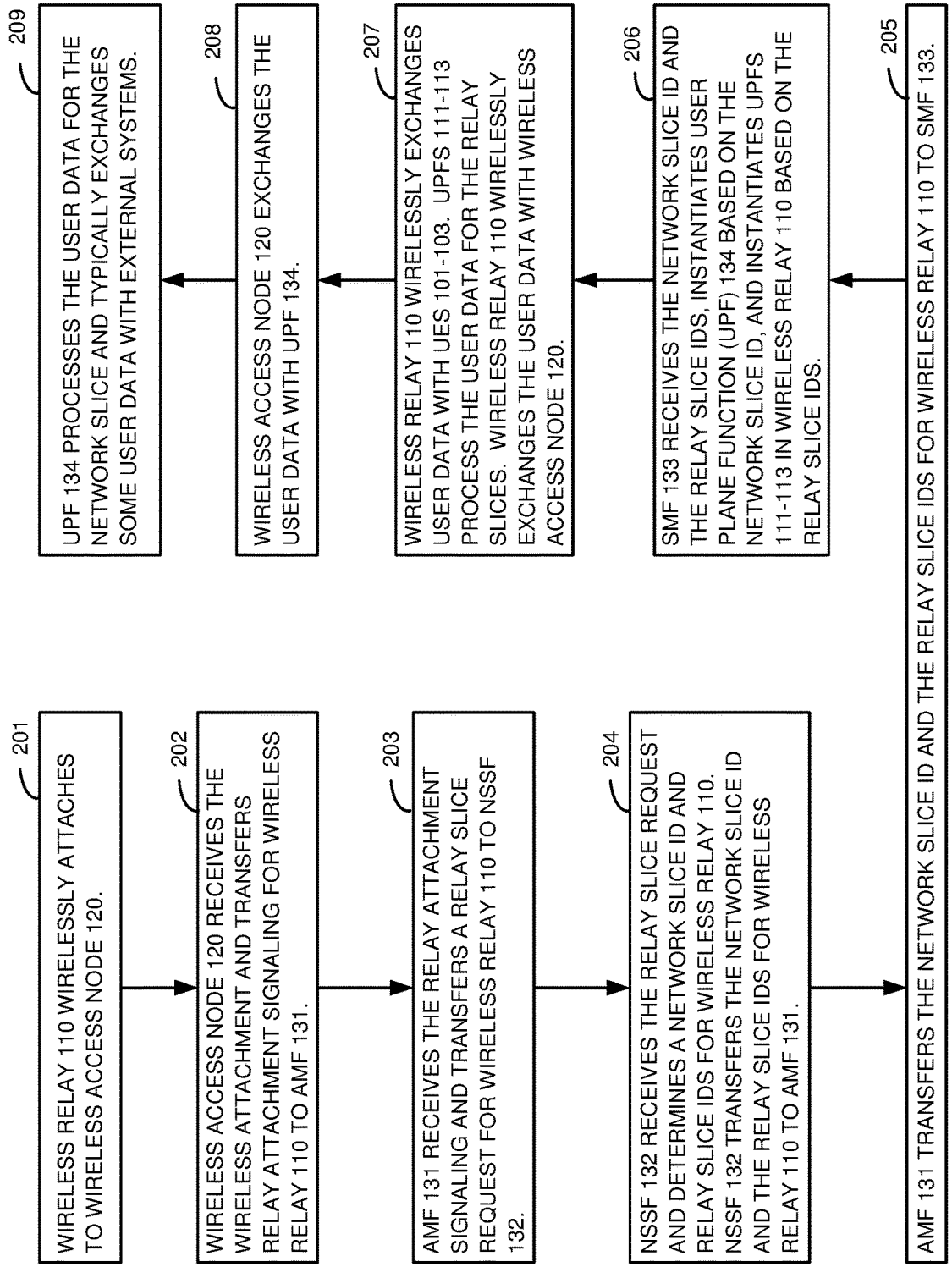
FIG. 2 illustrates an exemplary operation of the wireless communication network to serve the UEs over the relay slices in the wireless relay.

FIG. 2 illustrates an exemplary operation of wireless communication network 100 to serve UEs 101-103 over relay slices 115 in wireless relay 110. Wireless relay 110 wirelessly attaches to wireless access node 120 (201). Wireless access node 120 transfers relay attachment signaling for wireless relay 110 to AMF 131 (202). AMF 131 receives the relay attachment signaling and transfers a relay slice request for wireless relay 110 to NSSF 132 (203). NSSF 132 receives the relay slice request and determines a network slice ID and relay slice IDs for wireless relay 110 (204). NSSF 132 transfers the network slice ID and the relay slice IDs for wireless relay 110 to AMF 131 (204). AMF 131 transfers the network slice ID and the relay slice IDs for wireless relay 110 to SMF 133 (205). SMF 133 receives the network slice ID and the relay slice IDs, instantiates UPF 135 based on the network slice ID, and instantiates UPFs 111-113 in wireless relay 110 based on the relay slice IDs (206). Wireless relay 110 wirelessly exchanges user data with UEs 101-103, and UPFs 111-113 process the user data for relay slices 115 (207). Wireless relay 110 wirelessly exchanges the user data with wireless access node 120 (207). Wireless access node 120 exchanges the user data with UPF 135 (208). UPF 135 processes the user data for network slice 134 and typically exchanges some user data with external systems (209).

Figure 3:
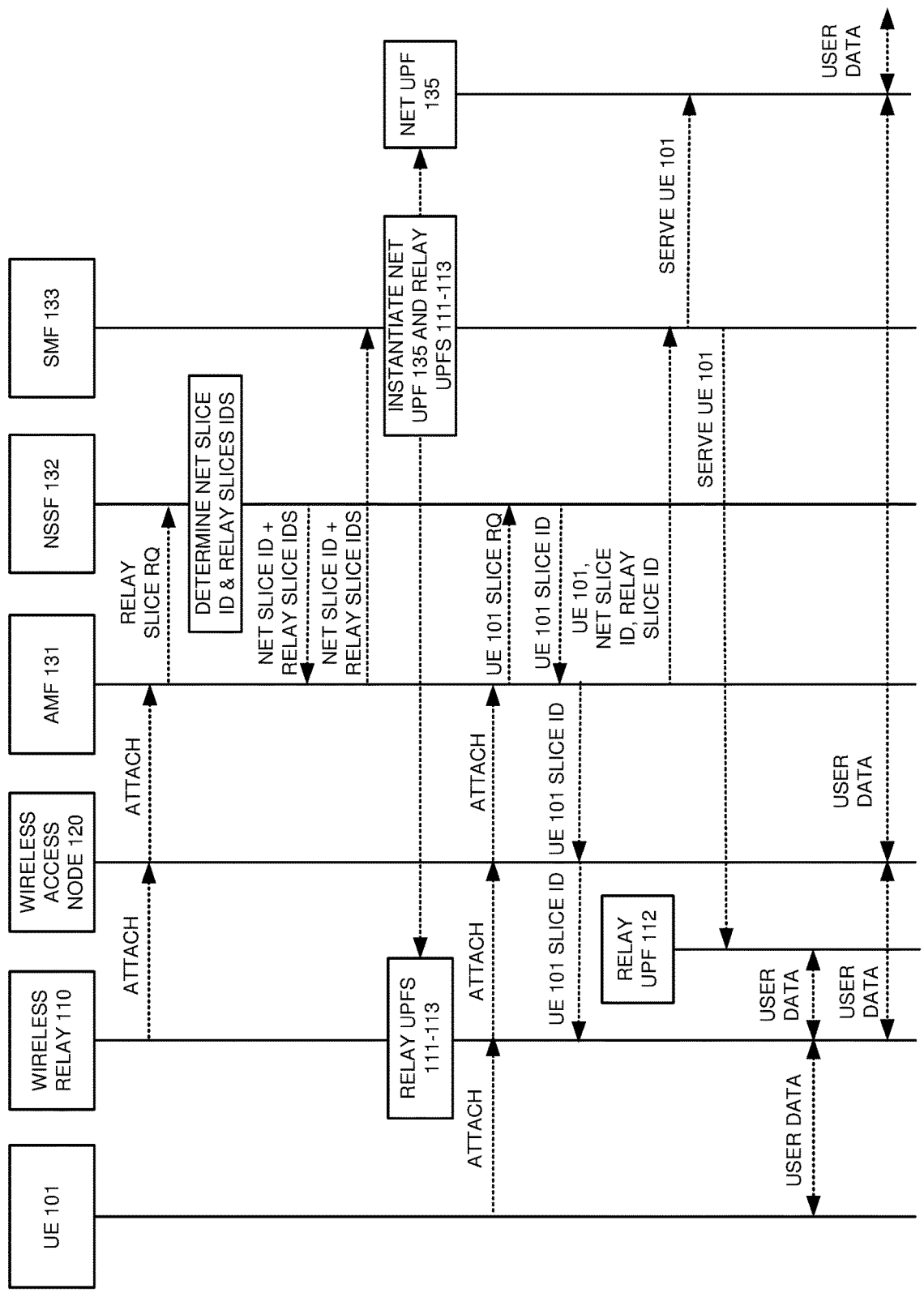
FIG. 3 illustrates an exemplary operation of the wireless communication network to serve the UEs over the relay slices in the wireless relay.

FIG. 3 illustrates an exemplary operation of wireless communication network 100 to serve UE 101 over relay slices 115 in wireless relay 110. Wireless relay 110 wirelessly attaches to wireless access node 120. In response to the wireless relay attachment, wireless access node 120 generates and transfers relay attachment signaling for wireless relay 110 to AMF 131. AMF 131 receives the relay attachment signaling, and in response, generates a relay slice request for wireless relay 110. AMF 131 transfers the relay slice request for wireless relay 110 to NSSF 132. NSSF 132 receives the relay slice request, and in response, determines a network slice ID and relay slice IDs for wireless relay 110. NSSF 132 transfers the network slice ID and the relay slice IDs to AMF 131, and in response, AMF 131 transfers the network slice ID and the relay slice IDs for wireless relay 110 to SMF 133. SMF 133 receives the network slice ID and the relay slice IDs, and in response, instantiates UPF 135 based on the network slice ID and instantiates UPFs 111-113 based on the relay slice IDs.

Wireless relay 110 wirelessly receives a UE attachment from UE 101. In response to the wireless UE attachment, wireless relay 110 generates and transfers UE attachment signaling for UE 101 to AMF 131 over wireless access node 120. AMF 131 receives the UE attachment signaling, and in response, generates a UE slice request for UE 101. AMF 131 transfers the UE slice request for UE 101 to NSSF 132. NSSF 132 receives the UE slice request, and in response, determines a relay slice ID for UE 101 that uses UPF 112. NSSF 132 transfers the relay slice ID to AMF 131, and in response, AMF 131 transfers the network slice ID and relay slice ID for UE 101 to SMF 133. SMF 133 receives network slice ID and relay slice ID for UE 101, and in response, directs UPF 112 and UPF 135 to serve UE 101. Wireless relay 110 wirelessly exchanges user data with UE 101. In wireless relay 110, UPF 112 processes the user data for UE 101 based on the relay slice ID for UE 101 from SMF 133. Wireless relay 110 wirelessly exchanges the user data with wireless node 120. Wireless access node 120 exchanges the user data with UPF 135. UPF 135 receives and processes the user data for network slice 134 and exchanges the user data with external systems based on the direction from SMF 133.

Figure 4:
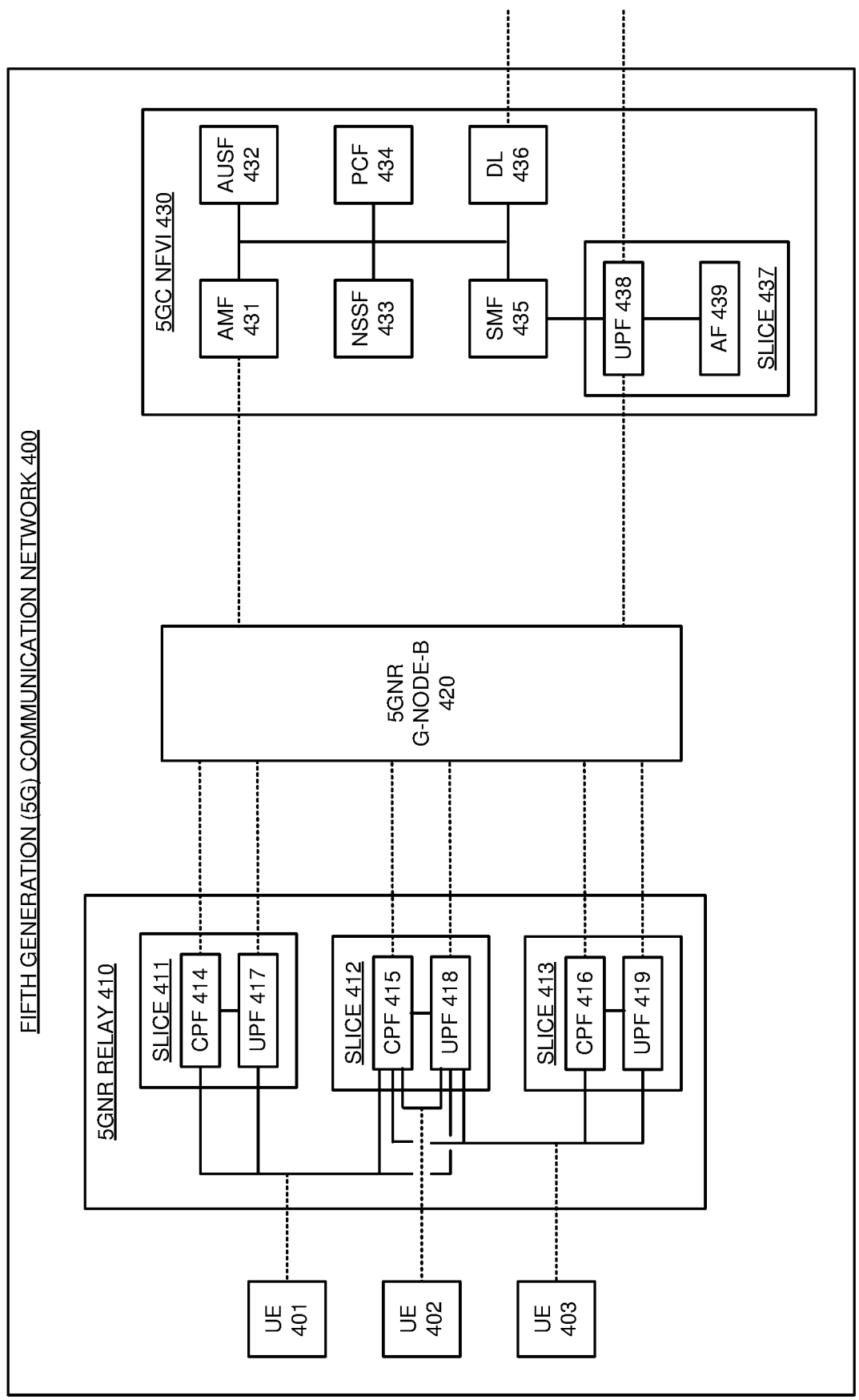
FIG. 4 illustrates a Fifth Generation (5G) communication network having a Fifth Generation New Radio (5GNR) wireless relay that serves UEs over relay slices.

FIG. 4 illustrates a Fifth Generation (5G) communication 400 network having Fifth Generation New Radio (5GNR) relay 410 that serves UEs 401-403 over relay slices 411-413. 5G communication network 400 comprises an example of wireless communication network 100, although network 100 may differ. 5G communication network 400 delivers wireless data services to UEs 401-403 like internet-access, video-calling, media-streaming, augmented-reality, machine-control, and/or some other wireless networking product. 5G communication network 400 comprises UEs 401-403, 5GNR relay 410, 5GNR gNodeB 420, and Fifth Generation Core Network Function Virtualization Infrastructure (5GC NFVI) 430. 5GNR relay 410 will eventually host relay slices 411-413. Relay slice 411 comprises Control Plane Function (CPF) 414 and User Plane Function (UPF) 417. Relay slice 412 comprises CPF 415 and UPF 418. Relay slice 413 comprises CPF 416 and UPF 419. 5GC NFVI 430 comprises Access and Mobility Management Functions (AMF) 431, Authentication and Security Functions (AUSF) 432, Network Slice Selection Functions (NSSF) 433, Policy Control Functions (PCF) 434, Session Management Functions (SMF) 435, Distributed Ledger (DL) 436, and network slice 437. Network slice 437 comprises User Plane Function (UPF) 438 and Application Function (AF) 439. DL 436 is linked to similar DL nodes in other 5GC NFVIs that are not shown for clarity. The number of UEs, relays, access nodes, slices, NFVIs, and network elements that are depicted on FIG. 4 has been restricted for clarity, and 5G communication network 400 typically comprises many more UEs, relays, access nodes, slices, NFVIs, and network elements.

Initially, wireless relay 410 does not host relay slices 411-413. Wireless relay 410 wirelessly attaches to 5GNR gNodeB 420, and 5GNR gNodeB 420 transfers N2/N1 signaling for wireless relay 410 to AMF 431. AMF 431 receives the N2/N1 signaling and interacts with both relay 410 and AUSF 432 to authenticate and authorize wireless relay 410. When authenticated and authorized, AMF 431 interacts with NSSF 433 to select relay slices 411-413 and network slice 437 for 5GNR relay 410. To select slices 411-413 and 437, NSSF 433 hosts a data structure that translates the IDs for 5GNR relay 410 and 5GNR gNodeB 420 into IDs for slices 411-413 and 437. AMF 431 interacts with PCF 434 and SMF 435 to select Quality-of-Service Flow Identifiers (QFIs), Dynamic Network Names (DNNs), network addresses, and the like for 5GNR relay 410. AMF 431 transfers the IDs for network slice 437 and relay slices 411-413 for 5GNR relay 410 to SMF 435 along with their corresponding DNNs, QFIs, addresses, and the like. SMF 435 instantiates UPF 438 and AF 439 in 5GC NFVI 430 based on the ID for network slice 437. SMF 435 and instantiates CPFs 414-416 and UPFs 417-419 in 5GNR relay 410 based on the IDs for relay slices 411-413. SMF 435 and 5GNR relay 410 may exchange N2/N1 signaling to perform relay slice instantiation and control.

5GNR relay 410 wirelessly receives 5GNR attachment signaling from UE 401. In response to the UE attachment, 5GNR relay 410 transfers 5GC N2/N1 signaling for UE 401 to AMF 431 over wireless access node 420. AMF 431 receives the 5GC N2 signaling and interacts with UE 401 and AUSF 432 to authenticate and authorize UE 401. When authenticated and authorized, AMF 431 interacts with NSSF 433 to select relay slices 411-412 for UE 401. To select slices 411-412, NSSF 433 hosts a data structure that translates the IDs for UE 401 and 5GNR relay 410 into IDs for relay slices 411-412. AMF 431 interacts with PCF 434 and SMF 435 to select QFIs, DNNs, network addresses, and the like for UE 401. AMF 431 transfers the IDs for relay slices 411-412 for UE 401 to SMF 435 along with their corresponding DNNs, QFIs, addresses, and the like. AMF 431 directs 5GNR gNodeB 420 and 5GNR relay 410 to serve UE 401 based on the selected slice IDs, QFIs, DNNs, network addresses, and the like for UE 401. 5GNR relay 410 indicates the selected slice IDs, QFIs, DNNs, network addresses, and the like to UE 401. SMF 435 directs UPF 438 and AF 439 to serve UE 401 based on the QFIs, DNNs, network addresses, and the like for UE 401. SMF 435 directs CPFs 414-415 to serve UE 401 based on the slice IDs, QFIs, DNNs, network addresses, and the like for UE 401. CPFs 414-415 direct UPFs 417-418 to serve UE 401 based on the slice IDs, QFIs, DNNs, network addresses, and the like for UE 401. UE 401 wirelessly exchanges 5GNR signaling and data with 5GNR relay 410. UPFs 417-418 exchange data with UPF 438 over 5GNR gNodeB 420. UPF 438 may exchange the data with external systems. AF 439 delivers a service to UE 401 like content-delivery, security, data storage, or the like.

5GNR relay 410 wirelessly receives 5GNR attachment signaling from UE 402. In response to the UE attachment, 5GNR relay 410 transfers 5GC N2/N1 signaling for UE 402 to AMF 431 over wireless access node 420. AMF 431 receives the 5GC N2/N1 signaling and interacts with UE 402 and AUSF 432 to authenticate and authorize UE 402. When authenticated and authorized, AMF 431 interacts with NSSF 433 to select relay slice 412 for UE 402. AMF 431 interacts with PCF 434 and SMF 435 to select QFIs, DNNs, network addresses, and the like for UE 402. AMF 431 transfers the ID for relay slice 412 for UE 402 to SMF 435 along with its corresponding DNNs, QFIs, addresses, and the like. AMF 431 directs 5GNR gNodeB 420 and 5GNR relay 410 to serve UE 402 based on the selected slice ID, QFIs, DNNs, network addresses, and the like for UE 401. 5GNR relay 410 indicates the selected slice ID, QFIs, DNNs, network addresses, and the like to UE 402. SMF 435 directs UPF 438 and AF 439 to serve UE 402 based on the QFIs, DNNs, network addresses, and the like for UE 402. SMF 435 directs CPF 415 to serve UE 402 based on the slice ID, QFIs, DNNs, network addresses, and the like for UE 402. CPF 415 directs UPF 418 to serve UE 402 based on the slice ID, QFIs, DNNs, network addresses, and the like for UE 402. UE 402 wirelessly exchanges 5GNR signaling and data with 5GNR relay 410. UPF 418 exchanges data with UPF 438 over 5GNR gNodeB 420. UPF 438 may exchange the data with external systems. AF 439 delivers a service to UE 402 like content-delivery, security, data storage, or the like.

5GNR relay 410 wirelessly receives 5GNR attachment signaling from UE 403. In response to the UE attachment, 5GNR relay 410 transfers 5GC N2/N1 signaling for UE 403 to AMF 431 over wireless access node 420. AMF 431 receives the 5GC N2/N1 signaling and interacts with UE 403 and AUSF 432 to authenticate and authorize UE 403. When authenticated and authorized, AMF 431 interacts with NSSF 433 to select relay slices 412-413 for UE 403. AMF 431 interacts with PCF 434 and SMF 435 to select QFIs, DNNs, network addresses, and the like for UE 403. AMF 431 transfers the IDs for relay slices 412-413 for UE 403 to SMF 435 along with their corresponding DNNs, QFIs, addresses, and the like. AMF 431 directs 5GNR gNodeB 420 and 5GNR relay 410 to serve UE 403 based on the selected slice IDs, QFIs, DNNs, network addresses, and the like for UE 401. 5GNR relay 410 indicates the selected slice IDs, QFIs, DNNs, network addresses, and the like to UE 403. SMF 435 directs UPF 438 and AF 439 to serve UE 403 based on the QFIs, DNNs, network addresses, and the like for UE 403. SMF 435 directs CPFs 415-416 to serve UE 403 based on the slice IDs, QFIs, DNNs, network addresses, and the like for UE 403. CPFs 415-416 direct UPFs 418-419 to serve UE 403 based on the slice IDs, QFIs, DNNs, network addresses, and the like for UE 403. UE 403 wirelessly exchanges 5GNR signaling and data with 5GNR relay 410. UPFs 418-419 exchange data with UPF 438 over 5GNR gNodeB 420. UPF 438 may exchange the data with external systems. AF 439 delivers a service to UE 403 like content-delivery, security, data storage, or the like.

SMF 435, CPF 414, and UPF 417 exert control over relay slice 411. SMF 435, CPF 414, and UPF 417 may control the wireless bandwidth that is used for slice 411 on the user-side and/or the network-side. SMF 435, CPF 415, and UPF 418 exert control for relay slice 412. SMF 435, CPF 415, and UPF 418 may control the wireless bandwidth that is used for slice 412 on the user-side and/or the network-side. SMF 435, CPF 416, and UPF 419 exert control for relay slice 413. SMF 435, CPF 416, and UPF 419 control the wireless bandwidth that is used for slice 413 on the user-side and/or the network-side. SMF 435 and/or CPFs 414-416 may reallocate the wireless bandwidth among relay slices 411-413. SMF 435 and/or CPFs 414-416 may control data rates for individual relay slices 411-413 on the user-side and/or the network-side. SMF 435 and/or CPFs 414-416 may reallocate the data rates among relay slices 411-413. In addition, SMF 435 and/or CPFs 414-416 may individually control the relay hardware that is used by relay slices 411-413. The relay hardware comprises components like CPU, memory, and network interfaces. SMF 435 and CPFs 414-416 may reallocate the relay hardware among relay slices 411-413.

In some examples, NSSF 433 transfers IDs for relay 410 and 5GNR gNodeB 420 to DL 436. DL 436 processes the relay and node IDs to generate consensus on the IDs for relay slices 411-413. To generate the consensus, DL 436 uses a data structure to translate the relay and node IDs into the slice IDs. Additional factors like location and backhaul quality may be used in the translation. DL 436 transfers a proposed transaction for the translation to other DL nodes that may be hosted by other NFVIs. When a threshold number of the DL nodes share matching translations, DL 436 and the other DL nodes identify a consensus. In response to the consensus, DL 436 and the other DL nodes store transaction data for the translation and transfer the slice IDs for the selected relay slices to NSSF 433.

In some examples, SMF 435 transfers IDs for relay slices 411-413 to DL 436. DL 436 processes the relay slice IDs to generate consensus on their corresponding CPFs 414-416 and UPFs 417-419. To generate the consensus, DL 436 uses a data structure to translate the relay slice IDs into CPF IDs and UPF IDs. Additional factors like location and backhaul quality may be used in the translation. DL 436 transfers a proposed transaction for the translation to the other DL nodes. When a threshold number of the DL nodes share matching translations, DL 436 and the other DL nodes identify a consensus. In response to the consensus, DL 436 and the other DL nodes store transaction data for the translation and transfer the IDs for the selected CPFs and UPFs to SMF 435.

In some examples, UPFs 417-419 generate usage data and transfer the usage data to CPFs 414-416. CPFs 414-416 transfer the usage data for their relay slices 411-413 to DL 436 over gNodeB 420, AMF 431, and SMF 435. The usage data comprises uplink and downlink data amounts by data type, time, error rate, and the like. DL 436 processes the relay slice usage data to generate consensus on the usage of individual relay slices 411-413. For example, DL 436 may use an intelligent network to process the usage data from CPFs 414-417 and identify slice usage levels, slice overuse, slice underuse, slice hardware consumption, slice billing amounts, and the like. DL 436 transfers a proposed transaction for the intelligent network results to the other DL nodes. When a threshold number of the DL nodes share matching intelligent network results, DL 436 and the other DL nodes identify a consensus. In response to the consensus, DL 436 and the other DL nodes store transaction data for the intelligent network results and transfer select intelligent network results to select data destinations.

Figure 5:
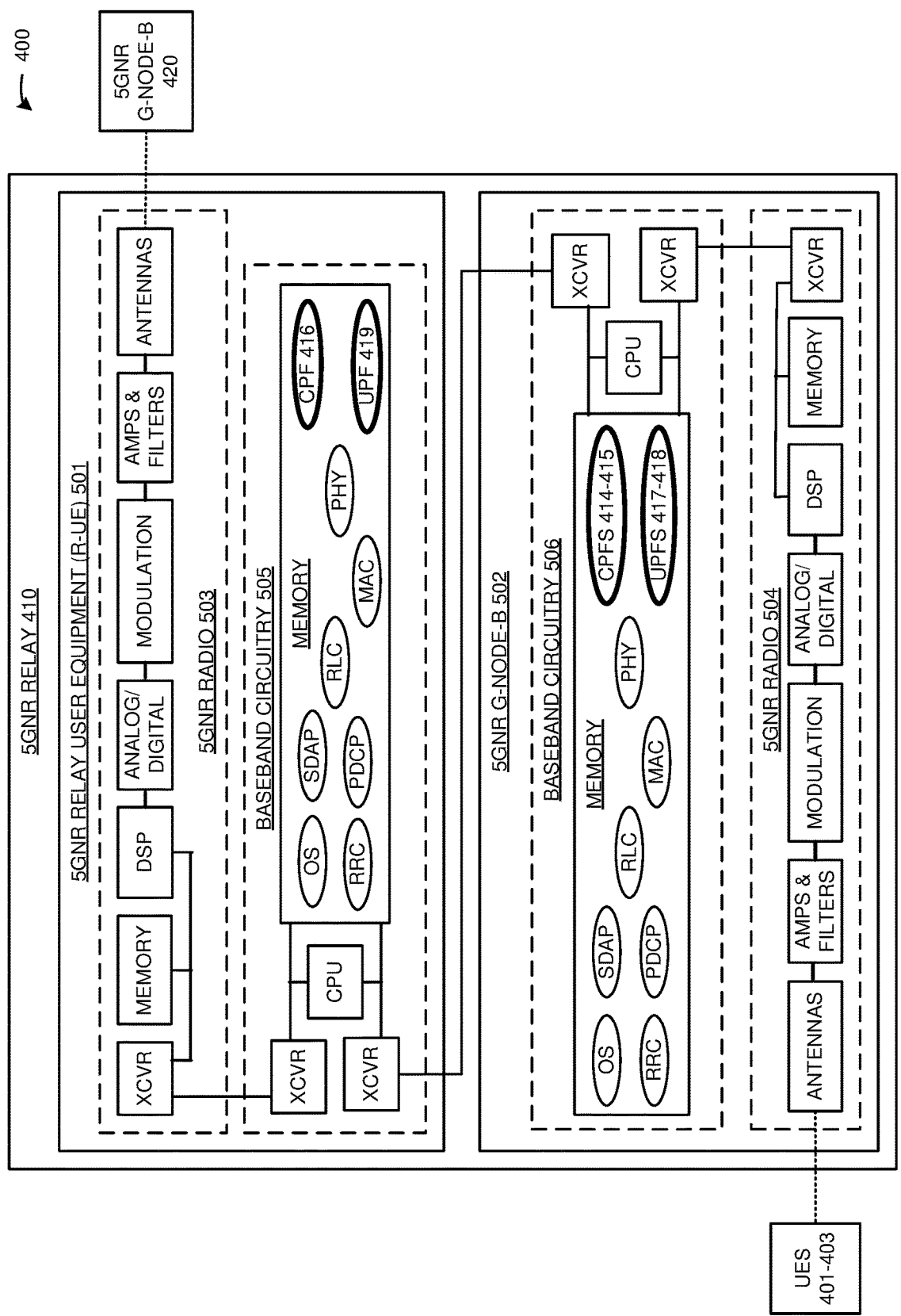
FIG. 5 illustrates the 5GNR wireless relay that serves the UEs over the relay slices.

FIG. 5 illustrates 5GNR relay 410 that serves 5GNR UEs 401-403 over the relay slices 411-413. 5GNR relay 410 comprises an example of wireless relay 110, although relay 110 may differ. 5GNR relay 410 comprises 5GNR Relay User Equipment (R-UE) 501 and 5GNR gNodeB 502. 5GNR R-UE 501 comprises 5GNR radio 503 and baseband circuitry 505. 5GNR gNodeB 502 comprises 5GNR radio 504 and baseband circuitry 506. 5GNR radios 503-504 comprise antennas, amplifiers, filters, modulation, analog-to-digital interfaces, DSP, memory, and transceivers (XCVRs) that are coupled over bus circuitry. Baseband circuitry 505-506 comprises memory, CPU, and transceivers that are coupled over bus circuitry. The memory in baseband circuitry 505 stores an operating system and network applications for Physical Layer (PHY), Media Access Control (MAC), Radio Link Control (RLC), Packet Data Convergence Protocol (PDCP), Service Data Adaptation Protocol (SDAP), Radio Resource Control (RRC), Control Plane Function (CPF) 416, and User Plane Function (UPF) 419. The memory in baseband circuitry 506 stores an operating system and network applications for PHY, MAC, RLC, PDCP, SDAP, Radio RRC, CPFs 414-415, and UPFs 417-418.

UEs 401-403 are wirelessly coupled to the antennas in 5GNR radio 504 over wireless 5GNR links. Transceivers in 5GNR radio 504 are coupled to transceivers in baseband circuitry 506 over data links. Transceivers in baseband circuitry 506 are coupled transceivers in baseband circuitry 505. Transceivers in baseband circuitry 505 are coupled to transceivers in 5GNR radio 503. The antennas in 5GNR radio 503 are wirelessly coupled to 5GNR gNodeB 420 over 5GNR links. The CPU in baseband circuitry 505-506 executes the operating systems, PHYs, MACs, RLCs, PDCPs, SDAPs, RRCs, CPFs 414-416, and UPFs 417-419 to exchange 5GNR signaling and data with UEs 401-403 and to exchange 5GNR signaling and data with 5GNR gNodeB 420.

CPFs 414-415 and SMF 435 exchange 5GC signaling over the RRC in 5GNR gNodeB 502, 5GNR R-UE 501, and gNodeB 420. The 5GC signaling may comprise N2 signaling that traverses AMF 431, gNodeB 420, and R-UE 501. CPF 416 and SMF 435 exchange 5GC signaling over the RRC in R-UE 501 and gNodeB 420, and this 5GC signaling may comprise N1 signaling that traverses AMF 431 and gNodeB 420. SMF 435 may direct the RRCs in baseband circuitry 505-506 over N2/N1 signaling to instantiate and control CPFs 414-416 and UPFs 417-419. SMF 435 may receive slice usage information from CPFs 414-416 and UPFs 417-419 over the RRCs in baseband circuitry 505-506 and N2/N1 signaling.

In 5GNR radio 504, the antennas receive wireless 5GNR signals from UEs 401-403 that transport uplink 5GNR signaling and data. The antennas transfer corresponding electrical uplink signals through duplexers to the amplifiers. The amplifiers boost the electrical uplink signals for filters which attenuate unwanted energy. Demodulators down-convert the filtered uplink signals from their carrier frequency. The analog/digital interfaces convert the demodulated analog uplink signals into digital uplink signals for the DSPs. The DSPs recover uplink 5GNR symbols from the uplink digital signals. In baseband circuitry 506, the CPU executes the network applications to process the uplink 5GNR symbols and recover the uplink 5GNR signaling and data. The network applications process the uplink 5GNR signaling, downlink 5GC N2 signaling, and X2 signaling to generate new downlink 5GNR signaling, new uplink 5GC N2 signaling, and new X2 signaling. The RRC transfers the new uplink 5GC N2 signaling over 5GNR R-UE 501 and gNodeB 420 to NFVI 430. The RRC transfers the new X2 signaling over 5GNR R-UE 501 and gNodeB 420 to other NodeBs. UPFs 417-418 process some of the uplink 5GNR data from the SDAP and transfer corresponding 5GC N3 data to NFVI 430 and X2 data to the other NodeBs over 5GNR R-UE 501 and 5GNR gNodeB 420.

In baseband circuitry 505, the RRC receives the uplink 5GC N2 and X2 signaling from the RRC in baseband circuitry 506. The SDAP in baseband circuitry 505 receives uplink 5GC N3 data (that may carry signaling and data for gNodeB 502) from UPFs 417-418 and the SDAP in baseband circuitry 506. The SDAP in baseband circuitry 506 transfers some of the uplink 5GC N3 data over 5GNR radio 503 to 5GNR gNodeB 420. The SDAP transfers other uplink 5GC N3 data to UPF 419. UPF 419 processes and transfers the uplink 5GC N3 data over 5GNR radio 503 to 5GNR gNodeB 420. CPF 416 controls UPF 419 and exchanges 5GC signaling with SMF 435 in NFVI 430 over 5GNR radio 503 and 5GNR gNodeB 420. The network applications in baseband circuitry 505 process downlink 5GNR signaling to generate new uplink 5GNR signaling. The RRC in baseband circuitry 505 transfers the new uplink 5GNR signaling over 5GNR radio 503 to 5GNR gNodeB 420. The 5GNR network applications in baseband circuitry 505 process the uplink 5GNR signaling and data to generate corresponding uplink 5GNR symbols that carry the signaling and data. In 5GNR radio 503, the DSP processes the uplink 5GNR symbols to generate corresponding digital signals for the analog-to-digital interfaces. The analog-to-digital interfaces convert the digital signals into analog signals for modulation. Modulation up-converts the analog signals to their carrier frequency. The amplifiers boost the modulated signals for the filters which attenuate unwanted out-of-band energy. The filters transfer the filtered electrical signals through duplexers to the antennas. The filtered electrical signals drive the antennas to emit corresponding wireless signals to 5GNR gNodeB 420 that transport the uplink 5GNR signaling and data which carries signaling and data for gNodeB 502.

In 5GNR radio 501, the antennas receive wireless 5GNR signals from 5GNR gNodeB 420 that transport downlink 5GNR signaling and data (which carries signaling and data for gNodeB 502). The antennas transfer corresponding electrical downlink signals through duplexers to the amplifiers. The amplifiers boost the electrical downlink signals for filters which attenuate unwanted energy. Demodulators down-convert the filtered downlink signals from their carrier frequency. The analog/digital interfaces convert the demodulated analog downlink signals into digital downlink signals for the DSPs. The DSPs recover downlink 5GNR symbols from the downlink digital signals. In baseband circuitry 505, the CPU executes the network applications to process the downlink 5GNR symbols and recover the downlink 5GNR signaling and data. The network applications process the downlink 5GNR signaling to generate the new uplink 5GNR signaling. UPF 419 processes some downlink 5GNR data and transfer corresponding 5GC N3 data to the SDAP in baseband circuitry 505. In baseband circuitry 506, the RRC receives the downlink 5GC N2 and X2 signaling from baseband circuitry 505. The SDAP in baseband circuitry 506 receives 5GC N3 data from UPF 419. UPFs 417-418 receive and process 5GC N3 data from the SDAP in baseband circuitry 505. CPFs 414-415 control UPFs 417-418 and exchange 5GC signaling with SMF 435 in NFVI 430 over 5GNR R-UE 501 and 5GNR gNodeB 420. In baseband circuitry 506, the 5GNR network applications process the downlink 5GNR signaling and data to generate corresponding downlink 5GNR symbols that carry the 5GNR signaling and data. In 5GNR radio 504, the DSP processes the downlink 5GNR symbols to generate corresponding digital signals for the analog-to-digital interfaces.

The analog-to-digital interfaces convert the digital signals into analog signals for modulation. Modulation up-converts the analog signals to their carrier frequency. The amplifiers boost the modulated signals for the filters which attenuate unwanted out-of-band energy. The filters transfer the filtered electrical signals through duplexers to the antennas. The filtered electrical signals drive the antennas to emit corresponding wireless signals to 5GNR UEs 401-403 that transport the downlink 5GNR signaling and data.

RRC functions comprise authentication, security, handover control, status reporting, Quality-of-Service (QoS), network broadcasts and pages, and network selection. SDAP functions comprise QoS marking and flow control. PDCP functions comprise security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid Automatic Repeat Request (HARQ), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, channel coding/decoding, channel estimation/equalization, and rate matching/de-matching, scrambling/descrambling, modulation mapping/de-mapping, layer mapping/de-mapping, precoding, Resource Element (RE) mapping/de-mapping, Fast Fourier Transforms (FFTs)/Inverse FFTs (IFFTs), and Discrete Fourier Transforms (DFTs)/Inverse DFTs (IDFTs).

Initially, wireless relay 410 does not host CPFs 414-416 and UPFs 417-419. 5GNR R-UE 501 wirelessly attaches to 5GNR gNodeB 420. In response to the relay attachment, SMF 435 directs the RRC or another application in baseband circuitry 506 to instantiate CPFs 414-415 and UPFs 417-418. In response to the relay attachment, SMF 435 directs the RRC or another application in baseband circuitry 505 to instantiate CPF 416 and UPF 419.

5GNR gNodeB 502 wirelessly receives 5GNR attachment signaling from UE 401. In response to the UE attachment, the RRC in baseband circuitry 506 transfers 5GC N2/N1 signaling for UE 401 to AMF 431 over 5GNR gNodeB 420. AMF 431 directs 5GNR gNodeB 420 and 5GNR relay 410 to serve UE 401 based on the selected slice IDs, QFIs, DNNs, network addresses, and the like for UE 401. 5GNR relay 410 indicates the selected slice IDs, QFIs, DNNs, network addresses, and the like to UE 401. SMF 435 directs CPFs 414-415 to serve UE 401 based on the selected slice IDs, QFIs, DNNs, network addresses, and the like for UE 401. CPFs 414-415 direct UPFs 417-418 to serve UE 401 based on the selected slice IDs, QFIs, DNNs, network addresses, and the like for UE 401. UE 401 wirelessly exchanges 5GNR signaling and data with 5GNR gNodeB 502. CPFs 414-415 exchange 5GC signaling with SMF 435. CPFs 414-415 process the 5GC signaling to control UPFs 417-418. UPFs 417-418 exchange data with 5GNR gNodeB 420 over R-UE 501.

5GNR gNodeB 502 wirelessly receives 5GNR attachment signaling from UE 402. In response to the UE attachment, the RRC in baseband circuitry 506 transfers 5GC N2/N1 signaling for UE 402 to AMF 431 over 5GNR gNodeB 420. AMF 431 directs 5GNR gNodeB 420 and 5GNR relay 410 to serve UE 402 based on the selected slice IDs, QFIs, DNNs, network addresses, and the like for UE 402. 5GNR relay 410 indicates the selected slice IDs, QFIs, DNNs, network addresses, and the like to UE 402. SMF 435 directs CPF 415 to serve UE 402 based on the selected slice IDs, QFIs, DNNs, network addresses, and the like for UE 402. CPF 415 directs UPF 418 to serve UE 402 based on the selected slice IDs, QFIs, DNNs, network addresses, and the like for UE 402. UE 402 wirelessly exchanges 5GNR signaling and data with 5GNR gNodeB 502. CPF 415 exchanges 5GC signaling with SMF 435. CPF 415 processes the 5GC signaling to control UPF 418. UPF 418 exchanges the data with 5GNR gNodeB 420 over R-UE 501.

5GNR gNodeB 502 wirelessly receives 5GNR attachment signaling from UE 403. In response to the UE attachment, the RRC in baseband circuitry 506 transfers 5GC N2/N1 signaling for UE 403 to AMF 431 over R-UE 501 and gNodeB 420. AMF 431 directs 5GNR gNodeB 420 and 5GNR relay 410 to serve UE 403 based on the selected slice IDs, QFIs, DNNs, network addresses, and the like for UE 403. 5GNR relay 410 indicates the selected slice IDs, QFIs, DNNs, network addresses, and the like to UE 403. SMF 435 directs CPFs 415-416 to serve UE 403 based on the selected slice IDs, QFIs, DNNs, network addresses, and the like for UE 403. CPFs 415-416 direct UPFs 418-419 to serve UE 403 based on the selected slice IDs, QFIs, DNNs, network addresses, and the like for UE 403. UE 403 wirelessly exchanges 5GNR signaling and data with 5GNR gNodeB 502. CPFs 415-416 exchange 5GC signaling with SMF 435. CPFs 415-416 process the 5GC signaling to control UPFs 418-419. UPFs 418-419 exchange the data with 5GNR gNodeB 420 over R-UE 501.

SMF 435, CPF 414, and UPF 417 exert control over relay slice 411. SMF 435, CPF 414, and UPF 417 may control the wireless bandwidth and/or data rate that is used for slice 411 on the user-side and/or the network-side. For example, CPF 414 may direct the MAC in baseband circuitry 506 to increase or decrease the amount of simultaneous resource blocks that are exchanged with UEs over relay slice 411. SMF 435, CPF 415, and UPF 418 exert control for relay slice 412. SMF 435, CPF 415, and UPF 418 may control the wireless bandwidth and/or data rate that is used for slice 412 on the user-side and/or the network-side. For example, CPF 415 may direct the RRC in baseband circuitry 505 to request an increase or decrease to the amount of simultaneous resource blocks that are exchanged with 5GNR gNodeB 420 for relay slice 412. SMF 435, CPF 416, and UPF 419 exert control for relay slice 413. SMF 435, CPF 416, and UPF 419 control the wireless bandwidth and/or data rate that is used for slice 413 on the user-side and/or the network-side. For example, SMF 435 may direct the RRCs in baseband circuitry 505-506 to request an increase or decrease in the amount of simultaneous resource blocks that are exchanged with UEs 401-403 and/or with 5GNR gNodeB 420. SMF 435 and/or CPFs 414-416 may reallocate the wireless bandwidth among and/or data rate among relay slices 411-413. In addition, SMF 435 and/or CPFs 414-416 may individually control the relay hardware that is used by relay slices 411-413. For example, SMF 435 may direct CPF 415 in baseband circuitry 506 to direct the operating system to increase or decrease the amount of CPU, memory, and network interfaces that are used for individual relay slices 411-413. SMF 435 and CPFs 414-416 may reallocate the relay hardware among relay slices 411-413. CPFs 414-416 may transfer usage data for their relay slices 411-413 to DL 436 over 5GNR R-UE 501, 5GNR gNodeB 420, AMF 431, and SMF 435. The usage data comprises uplink and downlink data amounts by data type, time, error rate, and the like.

Figure 6:
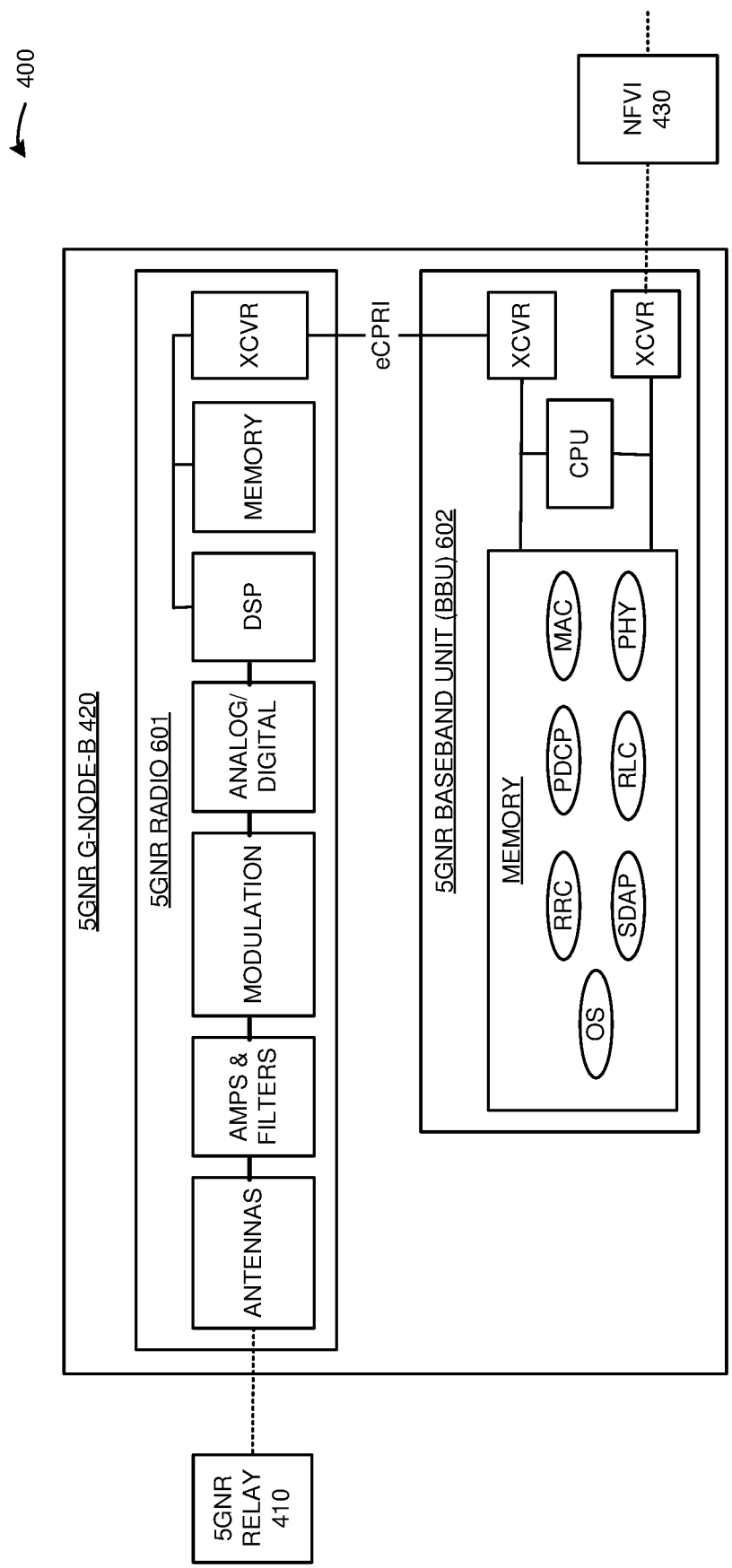
FIG. 6 illustrates a 5GNR gNodeB to serve the 5GNR wireless relay that serves the UEs over the relay slices.

FIG. 6 illustrates 5GNR gNodeB 420 to serve 5GNR relay 410 that serves 5GNR UEs 401-403 over relay slices 411-413. 5GNR gNodeB 420 comprises an example of wireless access node 120, although access node 120 may differ. 5GNR gNodeB 420 comprises 5GNR radio 601 and 5GNR Baseband Unit (BBU) 602. 5GNR radio 601 comprises antennas, amplifiers, filters, modulation, analog-to-digital interfaces, DSP, memory, and transceivers that are coupled over bus circuitry. 5GNR BBU 602 comprises memory, CPU, and transceivers that are coupled over bus circuitry. The memory in 5GNR BBU 602 stores an operating system and 5GNR network applications like PHY, MAC, RLC, PDCP, SDAP, and RRC. 5GNR BBU 602 may be physically separated into a Distributed Unit (DU) and a Centralized Unit (CU) that each resemble BBU 602. The CU and DU would each host a portion of the software in BBU 602 and would be coupled over fronthaul links.

5GNR relay 410 is wirelessly coupled to the antennas in 5GNR radio 601 over 5GNR links. Transceivers in 5GNR 601 are coupled to transceivers in 5GNR BBU 602 over enhanced CPRI (eCPRI) links. Transceivers in 5GNR BBU 602 are coupled to NFVI 430 over backhaul links. The CPU in 5GNR BBU 602 executes the operating system, PHY, MAC, RLC, PDCP, SDAP, and RRC to exchange 5GNR signaling and data with 5GNR relay 401 and to exchange 5GC/X2 signaling and data with NFVI 430 and other NodeBs. AMF 431 directs the RRC in 5GNR gNodeB 420 to serve UEs 401-403 based on their selected slice IDs, QFIs, DNNs, network addresses, and the like.

In 5GNR radio 601, the antennas receive wireless 5GNR signals from 5GNR relay 410 that transport uplink 5GNR signaling and data—and some of the data carries signaling and data for 5GNR gNodeB 502 in 5GNR relay 410. The antennas transfer corresponding electrical uplink signals through duplexers to the amplifiers. The amplifiers boost the electrical uplink signals for filters which attenuate unwanted energy. Demodulators down-convert the filtered uplink signals from their carrier frequency. The analog/digital interfaces convert the demodulated analog uplink signals into digital uplink signals for the DSPs. The DSPs recover uplink 5GNR symbols from the uplink digital signals. In 5GNR BBU 602, the CPU executes the network applications to process the uplink 5GNR symbols and recover the uplink 5GNR signaling and data. The network applications process the uplink 5GNR signaling, downlink 5GC signaling, and X2 signaling to generate new downlink 5GNR signaling, new uplink 5GC signaling, and new X2 signaling. The RRC transfers the new uplink 5GC signaling to NFVI 430 and the X2 signaling to other NodeBs. The SDAP transfers corresponding 5GC data to NFVI 430 and the other NodeBs.

In 5GNR BBU 602, the RRC receives the 5GC signaling from NFVI 430 and X2 signaling from the other NodeBs. The SDAP receives 5GC data from NFVI 430 and some of the data carries signaling and data for 5GNR gNodeB 502 in 5GNR relay 410. The SDAP receives X2 data from and the other NodeBs. The 5GNR network applications process the new downlink 5GNR signaling and downlink data to generate corresponding downlink 5GNR symbols. In 5GNR radio 601, the DSP processes the downlink 5GNR symbols to generate corresponding digital signals for the analog-to-digital interfaces. The analog-to-digital interfaces convert the digital signals into analog signals for modulation. Modulation up-converts the analog signals to their carrier frequency. The amplifiers boost the modulated signals for the filters which attenuate unwanted out-of-band energy. The filters transfer the filtered electrical signals through duplexers to the antennas. The filtered electrical signals drive the antennas to emit corresponding wireless signals to 5GNR relay 410 that transport the downlink 5GNR signaling and data, and some of the data carries signaling and data for 5GNR gNodeB 502 in 5GNR relay 410.

RRC functions comprise authentication, security, handover control, status reporting, QoS, network broadcasts and pages, and network selection. SDAP functions comprise QoS marking and flow control. PDCP functions comprise security ciphering, header compression and decompression, sequence numbering and re-sequencing, de-duplication. RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, windowing/de-windowing, guard-insertion/guard-deletion, parsing/de-parsing, control insertion/removal, interleaving/de-interleaving, FEC encoding/decoding, channel coding/decoding, channel estimation/equalization, and rate matching/de-matching, scrambling/descrambling, modulation mapping/de-mapping, layer mapping/de-mapping, precoding, RE mapping/de-mapping, FFTs/IFFTs, and DFTs/Inverse DFTs.

Figure 7:
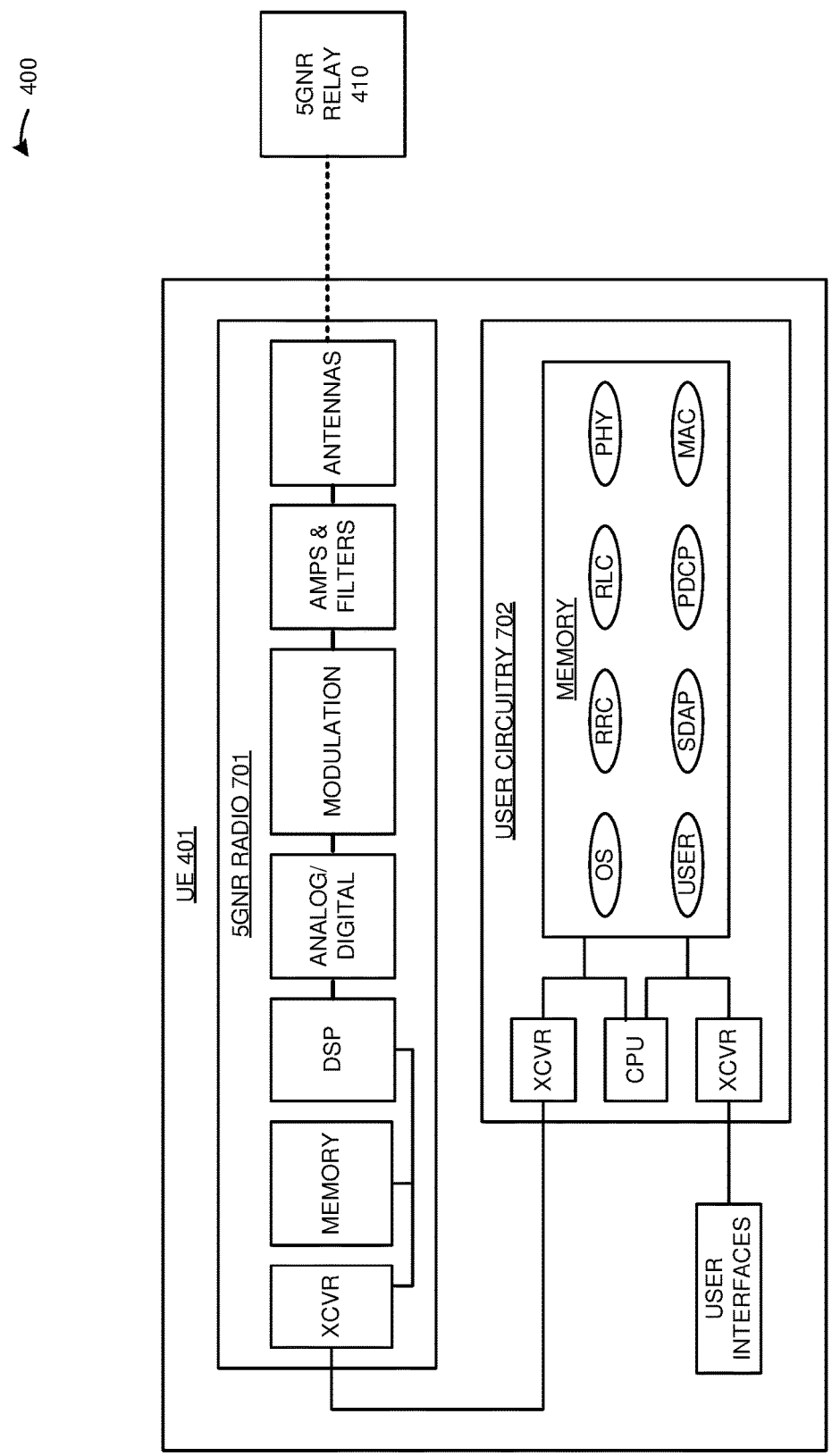
FIG. 7 illustrates one of the UEs that is served by the 5GNR wireless relay over the relay slices.

FIG. 7 illustrates 5GNR UE 401 that is served by 5GNR wireless relay 410 over relay slices 411-412. UE 401 comprises an example of UEs 101-103 and 402-403, although UEs 101-103 and 402-403 may differ. UE 401 comprises 5GNR radio 701 and user circuitry 702. 5GNR radio 701 comprises antennas, amplifiers, filters, modulation, analog-to-digital interfaces, DSP, memory, and transceivers that are coupled over bus circuitry. User circuitry 702 comprises memory, CPU, user interfaces, and transceivers that are coupled over bus circuitry. The memory in user circuitry 702 stores an operating system, user applications (USER), and 5GNR network applications for PHY, MAC, RLC, PDCP, SDAP, and RRC.

The antennas in 5GNR radio 701 are wirelessly coupled to 5GNR relay 410 over 5GNR links. A transceiver in 5GNR radio 701 is coupled to a transceiver in user circuitry 702. A transceiver in user circuitry 702 is typically coupled to the user interfaces like displays, controllers, memory, and the like. The CPU in user circuitry 702 executes the operating system, PHY, MAC, RLC, PDCP, SDAP, and RRC to exchange 5GNR signaling and data with 5GNR relay 410 over 5GNR radio 701.

In 5GNR radio 701, the antennas receive wireless signals from 5GNR relay 410 that transport downlink 5GNR signaling and data. The antennas transfer corresponding electrical signals through duplexers to the amplifiers. The amplifiers boost the received signals for filters which attenuate unwanted energy. Demodulators down-convert the amplified signals from their carrier frequency. The analog/digital interfaces convert the demodulated analog signals into digital signals for the DSP. The DSP transfers corresponding 5GNR symbols to user circuitry 702 over the transceivers. In user circuitry 702, the CPU executes the network applications to process the 5GNR symbols and recover the downlink 5GNR signaling and data. The 5GNR network applications receive new uplink signaling and data from the user applications. The network applications process the uplink user signaling the downlink 5GNR signaling to generate new downlink user signaling and new uplink 5GNR signaling. The network applications transfer the new downlink user signaling and data to the user applications.

The 5GNR network applications process the new uplink 5GNR signaling and user data to generate corresponding uplink 5GNR symbols that carry the uplink 5GNR signaling and data. In 5GNR radio 701, the DSP processes the uplink 5GNR symbols to generate corresponding digital signals for the analog-to-digital interfaces. The analog-to-digital interfaces convert the digital uplink signals into analog uplink signals for modulation. Modulation up-converts the analog signals to their carrier frequency. The amplifiers boost the modulated uplink signals for the filters which attenuate unwanted out-of-band energy. The filters transfer the filtered uplink signals through duplexers to the antennas. The electrical uplink signals drive the antennas to emit corresponding wireless 5GNR signals to 5GNR relay 410 that transport the uplink 5GNR signaling and data.

RRC functions comprise authentication, security, handover control, status reporting, QoS, network broadcasts and pages, and network selection. SDAP functions comprise QoS marking and flow control. PDCP functions comprise security ciphering, header compression and decompression, sequence numbering and re-sequencing, de-duplication. RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, windowing/de-windowing, guard-insertion/guard-deletion, parsing/de-parsing, control insertion/removal, interleaving/de-interleaving, FEC encoding/decoding, channel coding/decoding, channel estimation/equalization, and rate matching/de-matching, scrambling/descrambling, modulation mapping/de-mapping, layer mapping/de-mapping, precoding, RE mapping/de-mapping, FFTs/IFFTs, and DFTs/IDFTs.

The RRC in user circuitry 702 exchanges 5GNR signaling to with 5GNR relay 410 over 5GNR radio 701. During the exchange, the RRC interacts with AMF 431 for authentication and authorization. The RRC also receives slice IDs, QFIs, DNNs, network addresses, and the like from 5GNR relay 410. The SDAP in user circuitry 702 wirelessly exchanges 5GNR data with 5GNR relay 410 based on the slice IDs, QFIs, DNNs, network addresses, and the like.

Figure 8:
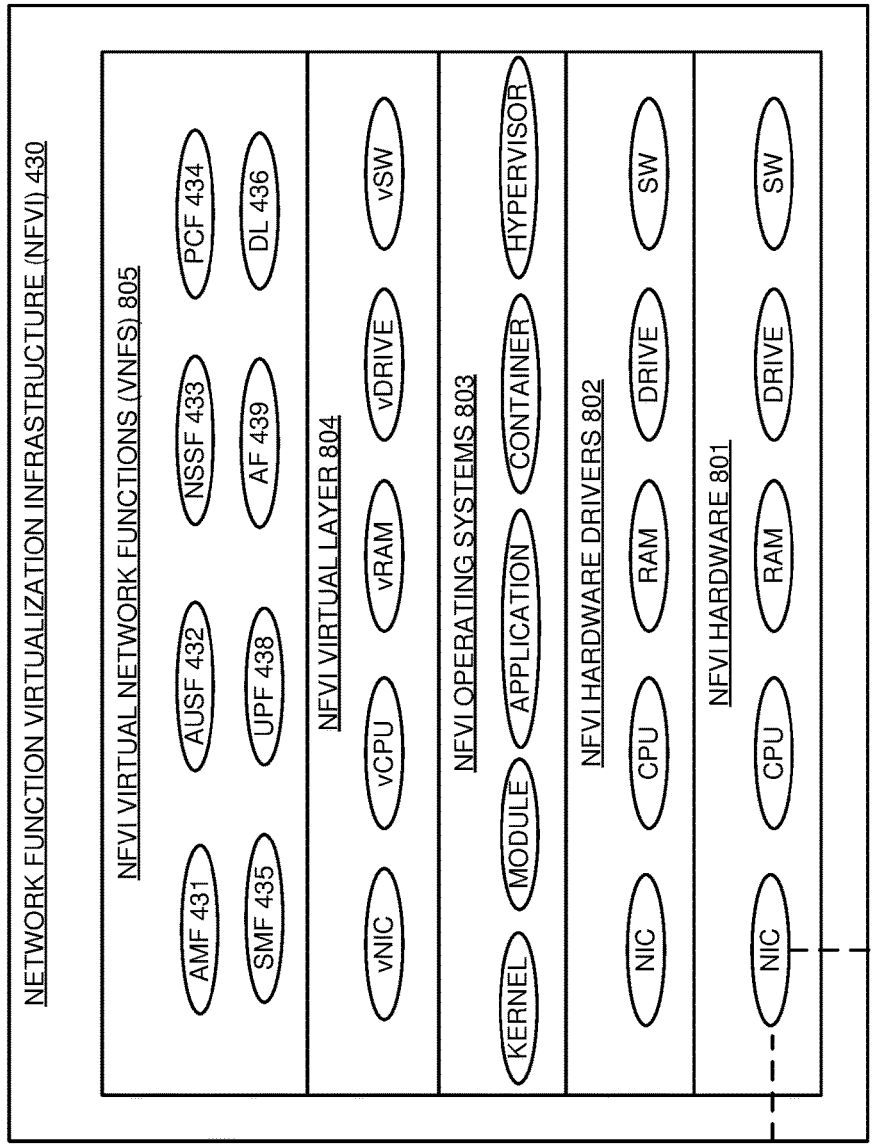
FIG. 8 illustrates a Fifth Generation Core (5GC) Network Function Virtualization Infrastructure (NFVI) to serve the UEs over the 5GNR wireless relay using the relay slices.

FIG. 8 illustrates Fifth Generation Core (5GC) Network Function Virtualization Infrastructure (NFVI) 530 to serve 5GNR UEs 401-403 over 5GNR wireless relay 410 using the relay slices. NFVI 430 comprises an example of network elements 130, although network elements 130 may differ. NFVI 430 comprises NFVI hardware 801, NFVI hardware drivers 802, NFVI operating systems 803, NFVI virtual layer 804, and NFVI Virtual Network Functions (VNFs) 805. NFVI hardware 801 comprises Network Interface Cards (NIC), CPU, RAM, flash/disk drives, and data switches (SW). NFVI hardware drivers 802 comprise software that is resident in the NIC, CPU, RAM, DRIVE, and SW. NFVI operating systems 803 comprise kernels, modules, applications, containers, hypervisors, and the like. NFVI virtual layer 804 comprises virtual NICs (vNIC), virtual CPUs (vCPU), virtual RAM (vRAM), virtual Drives (vDRIVE), and virtual Switches (vSW). NFVI VNFs 805 comprise Access and Mobility Management Functions (AMF) 431, Authentication and Security Functions (AUSF) 432, Network Slice Selection Functions (NSSF) 433, Policy Control Functions (PCF) 434, Session Management Functions (SMF) 435, Distributed Ledgers (DL) 436, User Plane Function (UPF) 438, and Application Function (AF) 439. Other VNFs are typically present but are omitted for clarity. The NIC are coupled to 5GNR gNodeB 420 and external systems. NFVI hardware 801 executes NFVI hardware drivers 802, NFVI operating systems 803, NFVI virtual layer 804, and NFVI VNFs 805 to serve UEs 401-403 over 5GNR gNodeB 420 and relay 410. NFVI 430 exchanges user data and 5GC signaling with 5GNR gNodeB 420 and other NodeBs to serve wireless data services to UEs 401-403. NFVI 430 exchanges some of the user data with external systems.

AMF 431 receives N2/N1 signaling for wireless relay 410 from 5GNR gNodeB 420. AMF 431 interacts with 5GNR relay 410 and AUSF 432 to authenticate and authorize 5GNR relay 410. When authenticated and authorized, AMF 431 interacts with NSSF 433 to select relay slices 411-413 and network slice 437 for 5GNR relay 410. AMF 431 interacts with PCF 434 and SMF 435 to select QFIs, DNNs, network addresses, and the like for 5GNR relay 410. AMF 431 transfers the IDs for network slice 437 and relay slices 411-413 for 5GNR relay 410 to SMF 435 along with their corresponding DNNs, QFIs, addresses, and the like. AMF 431 directs 5GNR gNodeB 420 and 5GNR relay 410 over N2/N1 signaling to use the selected slice IDs, QFIs, DNNs, network addresses, and the like for R-UE 501 in 5GNR relay 410. SMF 435 instantiates UPF 438 and AF 439 in 5GC NFVI 430 based on the ID for network slice 437. SMF 435 instantiates CPFs 414-416 and UPFs 417-419 in 5GNR relay 410 based on the IDs for relay slices 411-413.

AMF 431 receives 5GC N2/N1 signaling for UE 401 from 5GNR gNodeB 420. AMF 431 interacts with UE 401 and AUSF 432 to authenticate and authorize UE 401. When authenticated and authorized, AMF 431 interacts with NSSF 433 to select relay slices 411-412 for UE 401. AMF 431 interacts with PCF 434 and SMF 435 to select QFIs, DNNs, network addresses, and the like for UE 401. AMF 431 transfers the IDs for relay slices 411-412 for UE 401 to SMF 435 along with their corresponding DNNs, QFIs, addresses, and the like. AMF 431 directs 5GNR gNodeB 420 and 5GNR relay 410 over N2/N1 signaling to serve UE 401 based on the selected slice IDs, QFIs, DNNs, network addresses, and the like for UE 401. SMF 435 directs UPF 438 and AF 439 to serve UE 401 based on the slice IDs, QFIs, DNNs, network addresses, and the like for UE 401. SMF 435 directs CPFs 414-415 over N2 signaling to serve UE 401 based on the slice IDs, QFIs, DNNs, network addresses, and the like for UE 401. UPF 438 and UPFs 417-418 exchange data over 5GNR gNodeB 420. UPF 438 may exchange the data with external systems. AF 439 delivers a service to UE 401 like content-delivery, security, data storage, or the like.

AMF 431 receives 5GC N2/N1 signaling for UE 402 from 5GNR gNodeB 420. AMF 431 interacts with UE 402 and AUSF 432 to authenticate and authorize UE 402. When authenticated and authorized, AMF 431 interacts with NSSF 433 to select relay slice 412 for UE 402. AMF 431 interacts with PCF 434 and SMF 435 to select QFIs, DNNs, network addresses, and the like for UE 401. AMF 431 transfers the ID for relay slice 412 for UE 402 to SMF 435 along with their corresponding DNNs, QFIs, addresses, and the like. AMF 431 directs 5GNR gNodeB 420 and 5GNR relay 410 over N2/N1 signaling to serve UE 402 based on the selected slice ID, QFIs, DNNs, network addresses, and the like for UE 402. SMF 435 directs UPF 438 and AF 439 to serve UE 402 based on the QFIs, DNNs, network addresses, and the like for UE 402. SMF 435 directs CPF 415 over N2 signaling to serve UE 402 based on the slice ID, QFIs, DNNs, network addresses, and the like for UE 402. UPF 438 and UPF 418 exchange data over 5GNR gNodeB 420. UPF 438 may exchange the data with external systems. AF 439 delivers a service to UE 402 like content-delivery, security, data storage, or the like.

AMF 431 receives 5GC N2/N1 signaling for UE 403 from 5GNR gNodeB 420. AMF 431 interacts with UE 403 and AUSF 432 to authenticate and authorize UE 403. When authenticated and authorized, AMF 431 interacts with NSSF 433 to select relay slices 412-413 for UE 403. AMF 431 interacts with PCF 434 and SMF 435 to select QFIs, DNNs, network addresses, and the like for UE 403. AMF 431 transfers the IDs for relay slices 411-412 for UE 403 to SMF 435 along with their corresponding DNNs, QFIs, addresses, and the like. AMF 431 directs 5GNR gNodeB 420 and 5GNR relay 410 over N2/N1 signaling to serve UE 403 based on the selected slice IDs, QFIs, DNNs, network addresses, and the like for UE 403. SMF 435 directs UPF 438 and AF 439 to serve UE 403 based on the slice IDs, QFIs, DNNs, network addresses, and the like for UE 403. SMF 435 directs CPFs 415-416 over N2/N1 signaling to serve UE 403 based on the slice IDs, QFIs, DNNs, network addresses, and the like for UE 403. UPF 438 and UPFs 418-419 exchange data over 5GNR gNodeB 420. UPF 438 may exchange the data with external systems. AF 439 delivers a service to UE 403 like content-delivery, security, data storage, or the like.

NSSF 433 may transfer IDs for relay 410 and nodeB 420 to DL 436. DL 436 processes the relay and node IDs to generate consensus on the IDs for relay slices 411-413. DL 436 transfers a proposed transaction for the translation to other DL nodes that may be hosted by other NFVIs. When a threshold number of the DL nodes share matching translations, DL 436 and the other DL nodes identify the consensus. In response to the consensus, DL 436 and the other DL nodes store transaction data for the translation and transfer the IDs for the selected relay slices to NSSF 433.

SMF 435 may transfer IDs for relay slices 411-413 to DL 436. DL 436 processes the relay slice IDs to generate consensus on their corresponding CPFs 414-416 and UPFs 417-419. DL 436 transfers a proposed transaction for the translation to the other DL nodes. When a threshold number of the DL nodes share matching translations, DL 436 and the other DL nodes identify the consensus. In response to the consensus, DL 436 and the other DL nodes store transaction data for the translation and transfer the IDs for the selected CPFs and UPFs to SMF 435.

SMF 435 may receive usage data for relay slices from CPFs 414-416—possibly over N2 and/or N1 signaling. The usage data comprises uplink and downlink data amounts by data type, time, error rate, and the like. DL 436 processes the relay slice usage data to generate consensus on the usage of individual relay slices 411-413. DL 436 may use an intelligent network to process the usage data from CPFs 414-416 and identify slice usage levels, slice overuse, slice underuse, slice hardware consumption, slice billing amounts, and the like. DL 436 transfers a proposed transaction for the intelligent network results to the other DL nodes. When a threshold number of the DL nodes share matching intelligent network results, DL 436 and the other DL nodes identify the consensus. In response to the consensus, DL 436 and the other DL nodes store transaction data for the intelligent network results and transfer select intelligent network results to select data destinations.

Figure 9:
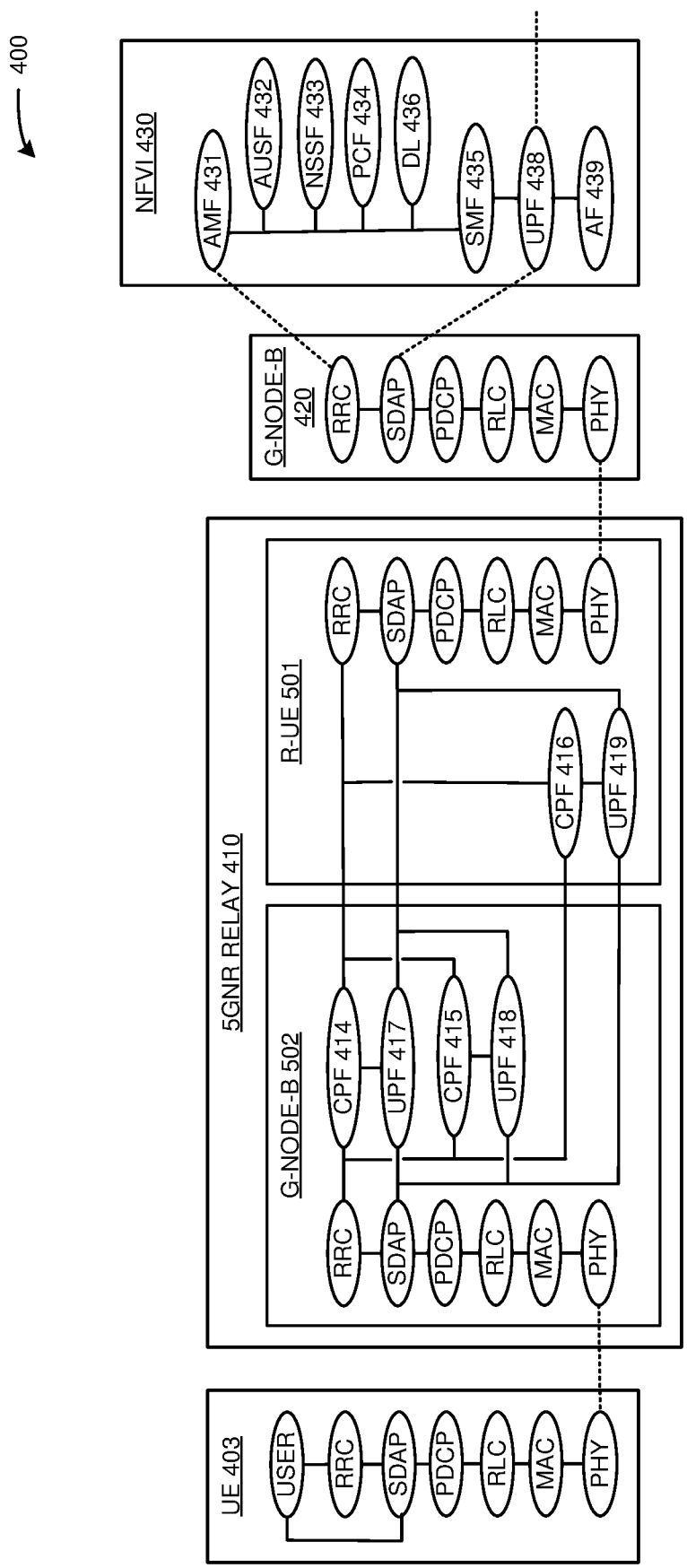
FIG. 9 illustrates an exemplary operation of the 5G communication network to serve one of the UEs over the relay slices.

FIG. 9 illustrates an exemplary operation of the 5G communication network 400 to serve 5GNR UE 403 over relay slices 412-413. The illustrated operation is exemplary and may vary in other examples. The 5GNR RRC in 5GNR relay 410 attaches to the 5GNR RRC in 5GNR gNodeB 420. The 5GNR RRC in gNodeB 420 exchanges 5GC N2/N1 signaling with the AMF 431 in NFVI 430. AMF 431 interacts with AUSF 432 to authenticate and authorize 5GNR relay 410 for services. AMF 431 interacts with NSSI 433 to select slices 411-413 and 437 for 5GNR relay 410. AMF 431 interacts with PCF 434 and SMF 435 to select DNNs, QFIs, network addressing, and the like to deliver the wireless data services to 5GNR relay 410. AMF 431 signals the RRC in 5GNR gNodeB 420 over N2 to serve 5GNR relay 410 per the slice IDs, DNNs, QFIs, and network addresses. The RRC in 5GNR gNodeB 420 signals the QFIs, DNNs, and network addresses for slice 437 to the RRC in 5GNR gNodeB 410. SMF 435 selects UPF 438 and AF 439 responsive to selected slice 437. SMF 435 signals the RRCs in 5GNR relay 410 over N2/N1 to instantiate CPFs 414-416 and UPFs 417-419 responsive to the slice IDs. The RRC in gNodeB 502 instantiates CPFs 414-415 and UPFs 417-418. The RRC in R-UE 502 instantiates CPF 416 and UPF 419.

The 5GNR RRC in UE 403 attaches to the 5GNR RRC in 5GNR gNodeB 502 in 5GNR relay 410. The 5GNR RRC in gNodeB 502 exchanges 5GC signaling with the AMF 431 in NFVI 430 over R-UE 502 and 5GNR gNodeB 420. AMF 431 interacts with AUSF 432 to authenticate and authorize UE 403 for services. AMF 431 interacts with NSSI 433 to select slices 412-413 and 437 for UE 403. AMF 431 interacts with PCF 434 and SMF 435 to select DNNs, QFIs, network addressing, and the like to deliver the wireless data services to UE 403. AMF 431 signals the RRC in 5GNR gNodeB 502 over N2 to serve UE 403 per the slice IDs, DNNs, QFIs, and network addressing. The RRC in 5GNR gNodeB 502 indicates the slice IDs, DNNs, QFIs, and network addressing to the RRC in UE 403. AMF 431 signals SMF 435 to serve UE 403 per the slice IDs, DNNs, QFIs, and network addressing. SMF 435 signals the RRC in baseband circuitry 506 over N2 to direct CPF 415 to serve UE 403 per the slice IDs, DNNs, QFIs, and network addressing for slice 412. CPF 415 directs UPF 418 to serve UE 403 per the slice IDs, DNNs, QFIs, and network addressing. SMF 435 also signals the RRC in baseband circuitry 505 over N1 to direct CPF 416 to serve UE 403 per the slice IDs, DNNs, QFIs, and network addressing for slice 413. CPF 416 directs UPF 419 to serve UE 403 per the slice IDs, DNNs, QFIs, and network addressing.

In UE 403, the user applications exchange user signaling with the RRC and exchange user data with the SDAP over the operating system. The SDAP in UE 403 and the SDAP in 5GNR gNodeB 502 exchange the user data to deliver the selected services per the QoS. The SDAP in 5GNR gNodeB 502 exchanges the user data for relay slice 412 with UPF 418. UPF 418 exchanges the user data for relay slice 412 with UPF 438 over R-UE 501 and gNodeB 420. The SDAP in 5GNR gNodeB 502 exchanges the user data for relay slice 413 with UPF 419 in R-UE 501. UPF 419 exchanges the data with UPF 438 over gNodeB 420. UPF 438 may exchange the data with external systems. AF 439 delivers a service to UE 403 like content-delivery, security, data storage, or the like.

The wireless data network circuitry described above comprises computer hardware and software that form special-purpose network circuitry to serve UEs over relay slices in wireless relays. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to serve UEs over relay slices in wireless relays.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to serve a wireless User Equipment (UEs) over relay slices in a wireless relay and a network slice in the wireless communication network, the method comprising:

the wireless relay wirelessly attaching to a wireless access node that responsively transfers relay attachment signaling for the wireless relay to an Access and Mobility Management Function (AMF);

the AMF receiving the relay attachment signaling for the wireless relay and responsively transferring a relay slice request for the wireless relay to a Network Slice Selection Function (NSSF), the NSSF receiving the relay slice request and responsively transferring a network slice Identifier (ID) for the network slice and relay slice IDs for the relay slices for the wireless relay to the AMF, the AMF receiving the network slice ID and the relay slice IDs and responsively transferring the network slice ID and the relay slice IDs for the wireless relay to a Session Management Function (SMF), and the SMF receiving the network slice ID and the relay slice IDs, and in response, instantiating a network User Plane Function (UPF) in the wireless communication network responsive to the network slice ID, instantiating relay UPFs in the wireless relay responsive to the relay slice IDs, and instantiating relay Control Plane Functions (CPFs) in the wireless relay for the relay slices;

the wireless relay wirelessly exchanging user data with the UEs, the relay UPFs processing the user data for the relay slices, the wireless relay wirelessly exchanging the user data with the wireless access node that exchanges the user data with the network UPF, the wireless relay wirelessly receiving UE attachments from the UEs and the CPFs responsively transferring UE attachment signaling for the UEs to the wireless access node that responsively transfers the UE attachment signaling to the AMF;

the AMF receiving the UE attachment signaling and responsively transferring UE slice requests for the UEs to the NSSF, the NSSF receiving the UE slice requests and responsively indicating the relay slice IDs for the UEs to the AMF, the AMF receiving the relay slice IDs for the UEs and responsively transferring the relay slice IDs for the UEs to the SMF, the SMF receiving the relay slice IDs for the UEs and responsively instructing the relay CPFs in the wireless relay to serve the UEs for the relay slices;

the CPFs in the wireless relay receiving the SMF instructions and responsively directing the relay UPFs in the wireless relay to serve the UE for the relay slices; and the network UPF receiving and processing the user data for the network slice.

2. The method of claim 1 wherein the NSSF indicating the relay slice IDs for the wireless relay to the AMF comprises:

the NSSF transferring a relay ID to distributed ledger; and the distributed ledger processing the relay ID and responsively generating a consensus on the relay slice IDs and indicating the relay slice IDs to the NSSF.

3. The method of claim 1 wherein the SMF instantiating the relay UPFs in the wireless relay for the relay slices comprises:

the SMF transferring the relay slice ID to a distributed ledger; and the distributed ledger receiving and processing the relay slice ID, and in response, generating a consensus on the relay UPF and indicating the relay UPF to the wireless relay.

4. The method of claim 1 further comprising:

the relay UPF in the wireless relay generating relay slice usage information and transferring the relay slice usage information to a distributed ledger; and the distributed ledger receiving and processing the relay slice usage information and responsively generating a consensus on usage of the relay slice.

5. The method of claim 1 wherein the wireless relay wirelessly exchanging the user data with the UEs comprises implementing individual wireless bandwidths specified for individual ones of the relay slices.

6. The method of claim 1 wherein the wireless relay wirelessly exchanging the user data with the UE, processing the user data with the relay UPFs for the relay slices, and wirelessly exchanging the user data with the wireless access node comprises the wireless relay using individual hardware amounts specified for individual ones of the relay slices.

7. The method of claim 1 wherein the wireless relay wirelessly exchanging the user data with the UE, processing the user data with the relay UPFs for the relay slices, and wirelessly exchanging the user data with the wireless access node comprises the wireless relay using individual data rates specified for individual ones of the relay slices.

8. The method of claim 1 wherein the wireless relay comprises:

a Fifth Generation New Radio (5GNR) gNodeB; and a 5GNR Relay User Equipment (R-UE).

9. A wireless communication network to serve a wireless User Equipment (UEs) over relay slices in a wireless relay and a network slice in the wireless communication network, the wireless communication network comprising:

the wireless relay wirelessly configured to attach to a wireless access node that responsively transfers relay attachment signaling for the wireless relay to an Access and Mobility Management Function (AMF);

the AMF configured to receive the relay attachment signaling for the wireless relay and responsively transfer a relay slice request for the wireless relay to a Network Slice Selection Function (NSSF), the NSSF configured to receive the relay slice request and responsively transfer a network slice Identifier (ID) for the network slice and relay slice IDs for the relay slices for the wireless relay to the AMF, the AMF configured to receive the network slice ID and the relay slice IDs and responsively transfer the network slice ID and the relay slice IDs for the wireless relay to a Session Management Function (SMF), and the SMF configured to receive the network slice ID and the relay slice IDs, and in response, instantiate a network User Plane Function (UPF) in the wireless communication network responsive to the network slice ID, instantiate relay UPFs in the wireless relay responsive to the relay slice IDs, and instantiate relay Control Plane Functions (CPFs) in the wireless relay for the relay slices;

the wireless relay configured to wirelessly exchange user data with the UEs, the relay UPFs configured to process the user data for the relay slices, the wireless relay configured to wirelessly exchange the user data with the wireless access node that exchanges the user data with the network UPF, the wireless relay configured to wirelessly receive UE attachments from the UEs, and the CPFs configured to responsively transfer UE attachment signaling for the UEs to the wireless access node that responsively transfers the UE attachment signaling to the AMF;

the AMF configured to receive the UE attachment signaling and responsively transfer UE slice requests for the UEs to the NSSF, the NSSF configured to receive the UE slice requests and responsively indicate the relay slice IDs for the UEs to the AMF, the AMF configured to receive the relay slice IDs for the UEs and responsively transfer the relay slice IDs for the UEs to the SMF, the SMF configured to receive the relay slice IDs for the UEs and responsively instruct the relay CPFs in the wireless relay to serve the UEs for the relay slices;

the CPFs in the wireless relay configured to receive the SMF instructions and responsively direct the relay UPFs in the wireless relay to serve the UE for the relay slices; and the network UPF configured to receive and process the user data for the network slice.

10. The wireless communication network of claim 9 wherein:

the NSSF is configured to transfer a relay ID to distributed ledger; and the distributed ledger is configured to process the relay ID and responsively generate a consensus on the relay slice IDs and indicate the relay slice IDs to the NSSF.

11. The wireless communication network of claim 9 wherein:

the SMF is configured to transfer the relay slice ID to a distributed ledger; and the distributed ledger is configured to receive and process the relay slice ID, and in response, generate a consensus on the relay UPF and indicate the relay UPF to the wireless relay.

12. The wireless communication network of claim 9 further comprising:

the relay UPF in the wireless relay configured to generate relay slice usage information and transfer the relay slice usage information to a distributed ledger; and the distributed ledger configured to receive and process the relay slice usage information and responsively generate a consensus on usage of the relay slice.

13. The wireless communication network of claim 9 wherein the wireless relay is configured to implement individual wireless bandwidths specified for individual ones of the relay slices.

14. The wireless communication network of claim 9 wherein the wireless relay is configured to use individual hardware amounts specified for individual ones of the relay slices.

15. The wireless communication network of claim 9 wherein the wireless relay is configured to use individual data rates specified for individual ones of the relay slices.

16. The wireless communication network of claim 9 wherein the wireless relay comprises:

a Fifth Generation New Radio (5GNR) gNodeB; and a 5GNR Relay User Equipment (R-UE).

* * * * *